(No Model.)
R. M. DUVALL.
HEDGE.
No. 313,408. Patented Mar. 3, 1885.
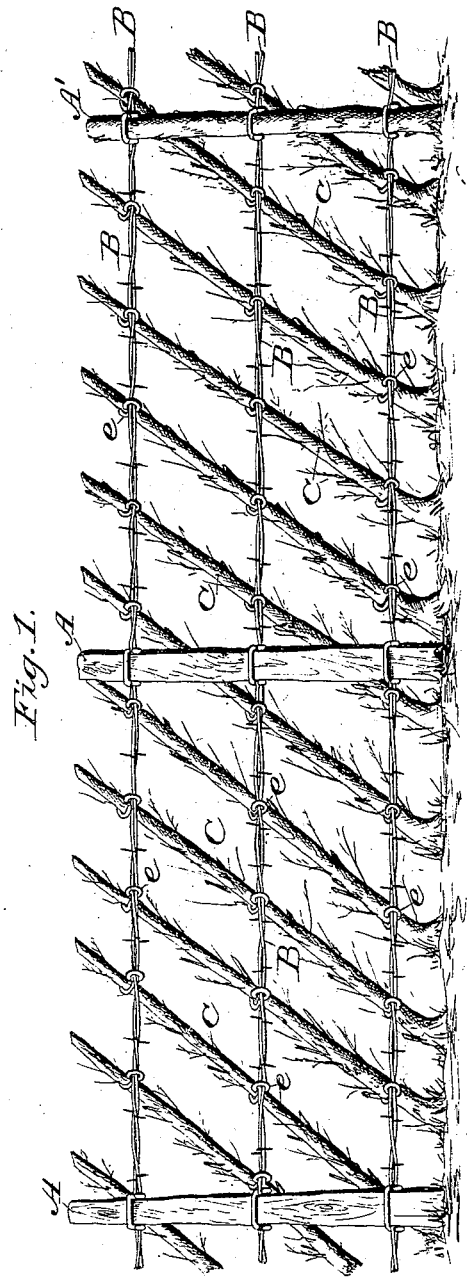
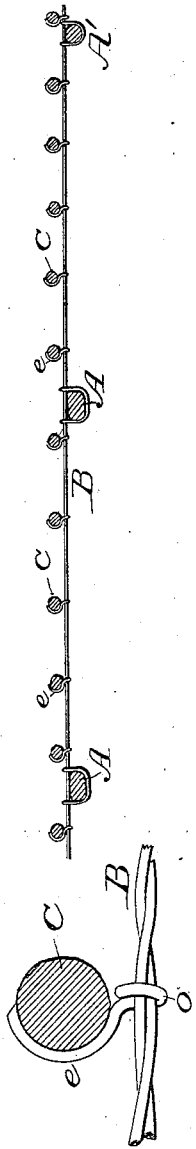
Witnesses:
Jas. T. DuHamel.
Walter S. Dodge.
Inventor:
R. M. Duvall.
by Dodge & Son,
Attys.

 UNITED STATES PATENT OFFICE.

REID M. DUVALL, OF NASHVILLE, TENNESSEE.

HEDGE.

SPECIFICATION forming part of Letters Patent No. 313,408, dated March 3, 1885.

Application filed August 25, 1884. (No model.)

*To all whom it may concern:*

Be it known that I, REID M. DUVALL, of Nashville, in the county of Davidson and State of Tennessee, have invented certain new and useful Improvements in Hedges, of which the following is a specification.

This invention relates to certain improvements in the construction of live hedges, as hereinafter more fully set forth.

Figure 1 is a side elevation, and Fig. 2 a plan view, of a hedge embodying my improvements. Fig. 3 is a transverse section enlarged and showing the manner of securing and holding the plants in position.

In the rearing of live hedges it is desirable after the plants have grown to the proper size (which is usually the third or fourth year after planting) to bend or incline the main stalk of the several plants, in order to secure the best results. Originally this was accomplished by partially severing or cutting the body of the plant near the ground, then bending it over and securing it by pegs or stakes driven into the ground. Of late years other methods have been devised, such as securing them in position by wire braces, or by driving nails or staples into the stems or bodies of the plants, to secure them to a horizontal wire fastened to the plants after the latter have been secured in the bent position by means of wire braces. It will readily be seen that all such plans tend to injure the plants by destroying their vitality and growth, and that where wires are woven or wound tightly around the plants they not only cut into the stem as the latter grows, thereby preventing the circulation of the sap in the part above, but they so weaken the stem as to render it very liable to be broken off at that point.

The object of my invention is to obviate these difficulties or objections by providing a means of securing the plants in a bent or inclined position without injuring their vitality or growth, which shall be easy of application, and by which a fence for temporary use may be provided until the hedge has grown to a sufficient size to serve as a fence.

In carrying out my invention I first set posts A at suitable distances apart, and secure thereto two or more strands of wire, B, as shown clearly in Fig. 1. These strands B may be either single or double, and may be either plain or barbed, as preferred, according to the circumstances of the case. If, for instance, the plants C be already grown of sufficient size to bend, a plain wire may be used at the top to fasten the plants to, but if the plants be young, and it is desired to provide a temporary fence for their protection and to prevent the passage of animals, then barbed wire should be used, preferably three strands, as represented in Fig. 1. In either case I prefer that the bottom strand be of barbed wire, as there are always apt to be more or less openings or spaces at the bottom, where pigs or other small animals can crowd through, and the use of a barbed wire at that point renders the fence more perfect, even after the hedge has become of full height. In the case of a new hedge, when the plants have grown to the proper size, (usually the third or fourth season after they are planted,) the side branches are mostly trimmed or cut off, and the main stems or bodies C cut off at their tops, so as to make them of uniform heights, as shown in Fig. 1. Commencing at one end, the first stem or plant C is bent below the surface of the ground, and the body inclined to an angle of forty-five degrees, or thereabout, and then secured to the horizontal wires B by means of wire hooks e, as represented in Figs. 1 and 3.

In order to prevent injury to the plants, these hooks e are made of such sized wire as is just sufficient to hold the plant in position, and are made to extend but about half-way around the stem of the plant C, as shown more clearly in Fig. 3, so that as the plant grows and increases in diameter the hook will yield by opening, and thus be prevented from girdling or cutting into the plant. These hooks are made separate from the wire strands, and are applied at the time the plants are bent, as above described, the smaller bend o of the hooks being left open when they are made, sufficiently to enable them to be readily hooked onto the strand B, upon which they are then tightly clamped by a pair of pliers, or any suitable tool. They may be first clamped to the strands at intervals corresponding to the positions of the plants, and the plants be then bent over and hooked therein; or they may be first hooked around the plant C, the latter then be bent into position, and the hook then fastened to the strand B, whichever is found most convenient in practice.

In the drawings I have shown the plants C as being fastened by the hooks *e* to each of the three strands; but I do not limit my invention to this specific arrangement, as it is obvious that the plants may be fastened at more or less points, as may be preferred. In some cases it may be sufficient to secure them to the upper strand alone; but by securing them at several points the stems C can be made to assume a more perfectly parallel and uniform position in relation to each other, and thus produce a more uniform hedge.

In cases where it is desired to plant a new hedge, and a fence for use in the meantime is not desired, the posts A may be dispensed with by simply substituting separate plants, which when grown may serve in lieu of the posts for supporting the horizontal wires or strands B, the latter of course not being put up until the plants have grown to the proper size for bending. In such case the separate plants which are to serve as posts will be set about six inches, more or less, to one side of the main row, as shown in Fig. 2, in which A' indicates said separate or post plants, one also being shown in elevation at the right-hand end of Fig. 1. In such cases, when the plants have grown to proper size, they will all be trimmed, as before described, including the lateral or post plants A', after which the strands B will be secured to these post plants A', and the plants of the main row then be bent and secured to the strands B by the hooks *e* in the same manner as when the fence-posts A are used.

This invention is also applicable to old hedges, it only being necessary to set the posts A, secure the horizontal wires B thereto alongside of the old hedge, then trim the plants, bend them over, and secure them to the wires B in the manner already described. In all cases after the plants have been thus trimmed and secured in the inclined position as described they will send out a large number of side branches, which assuming a more or less upright position will fill all the intervening spaces, and thus produce a most perfect and uniform hedge. By these means I avoid all injury to the plants, and when desired also produce a fence which will serve to protect the young plants, and also serve as an ordinary fence until the hedge has grown sufficiently to assume its proper functions as a fence, and which can then be utilized as a means of holding the plants which constitute the hedge in their inclined and proper position.

Having thus fully described my invention, what I claim is—

In combination with a row of hedge-plants, the horizontal fixed wires B, and the open-ended hooks *e*, having one end attached to the wires and the other or open end passed partly around the plant, substantially as shown and described.

REID M. DUVALL.

Witnesses:
H. L. ALLEN,
J. M. LILLARD.